(12) United States Patent
Moro et al.

(10) Patent No.: US 8,215,819 B2
(45) Date of Patent: Jul. 10, 2012

(54) CLIP AND BACKLIGHT ASSEMBLY

(75) Inventors: Shuuji Moro, Tokyo (JP); Yuichi Suzuki, Kanagawa (JP); Hiroshi Takatsuka, Kanagawa (JP); Eiji Ide, Tokyo (JP); Hirokazu Shibata, Tokyo (JP)

(73) Assignee: Sony Corporation (JP)

( * ) Notice: Subject to any disclaimer, the term of this patent is extended or adjusted under 35 U.S.C. 154(b) by 431 days.

(21) Appl. No.: 12/456,193

(22) Filed: Jun. 12, 2009

(65) Prior Publication Data
US 2010/0008066 A1    Jan. 14, 2010

(30) Foreign Application Priority Data

Jun. 18, 2008  (JP) ................ P2008-159640

(51) Int. Cl.
*F21V 7/04* (2006.01)
(52) U.S. Cl. .............. 362/634; 362/632; 362/633
(58) Field of Classification Search .......... 362/600–634, 362/97.1–97.4
See application file for complete search history.

(56) References Cited

U.S. PATENT DOCUMENTS

| 6,749,157 | B2 | 6/2004 | Takeuchi | |
| 2005/0073858 | A1* | 4/2005 | Kim et al. | 362/561 |
| 2007/0019419 | A1* | 1/2007 | Hafuka et al. | 362/612 |
| 2009/0046445 | A1* | 2/2009 | Namiki et al. | 362/97.2 |

FOREIGN PATENT DOCUMENTS

| JP | 05015455 A | 1/1993 |
| JP | 2003-278723 A | 10/2003 |
| JP | 2006049098 A | 2/2006 |
| JP | 2006-183772 A | 7/2006 |
| JP | 2007322697 A | 12/2007 |
| JP | 2008-071586 A | 3/2008 |

OTHER PUBLICATIONS

Office Action from Japanese Application No. 2008-159640, dated Apr. 20, 2010.

* cited by examiner

*Primary Examiner* — William Carter
(74) *Attorney, Agent, or Firm* — Lerner, David, Littenberg, Krumholz & Mentlik, LLP

(57) ABSTRACT

A clip provided by the present invention includes an insert portion that is inserted into an insertion hole formed in a flat-shaped chassis and that engages with the chassis, and a collar portion that is formed in a flat shape around the circumference of the insert portion. When the insert portion is inserted into the insertion hole, the collar portion and the chassis clamp at least one light emitting board that is positioned in contact with the chassis, and the thickness of the collar portion is set to be equal to or less than an amount of protrusion of a light emitting portion formed protrudingly from the light emitting board.

9 Claims, 9 Drawing Sheets

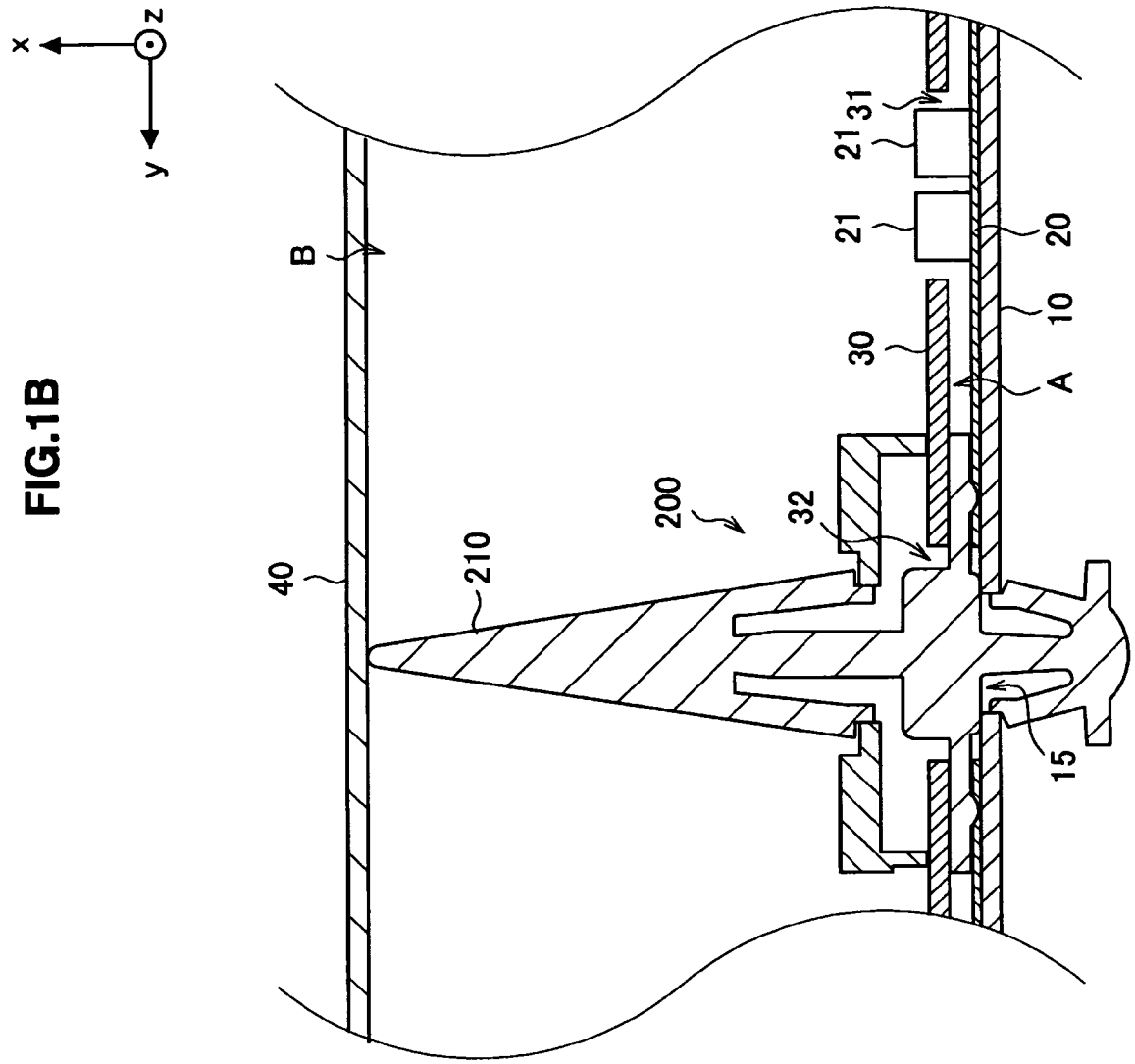

CLIP AND BACKLIGHT ASSEMBLY

The present application claims priority from Japanese Patent Application No. JP 2008-159640 filed in the Japanese Patent Office on Jun. 18, 2008, the entire content of which is incorporated herein by reference.

BACKGROUND OF THE INVENTION

1. Field of the Invention

The present invention relates to a clip and a backlight assembly.

2. Description of the Related Art

Flat type image display devices have been developed in recent years, and the display devices are being made increasingly thinner. Of these, display devices such as liquid crystal display devices, for example, are equipped with a backlight assembly in addition to a liquid crystal panel that forms the image. The backlight assembly has, for example, a light emitting board on which are positioned light emitting portions such as LED or FL tubes and the like, and in the case of a liquid crystal display device, the light emitting board emits a predetermined light towards the liquid crystal panel. The image is then formed by the light passing through the liquid crystal panel.

The thickness of the backlight assembly accounts for much of the thickness of the display device, and therefore making a lower profile backlight assembly is extremely important to make the display device thinner (refer to Japanese Patent Application Publication No. JP-A-2003-278723, Japanese Patent Application Publication No. JP-A-2006-183772 and Japanese Patent Application Publication No. JP-A-2008-71586).

SUMMARY OF THE INVENTION

A backlight assembly has many structural elements such as light-emitting boards and so on, and fixing members that fix each of the components are necessary. This type of fixing member is often an obstacle to achieving a backlight assembly with a lower profile. Here, to achieve a thinner backlight assembly, it is conceivable, for example, for adhesive members etc. to be used in place of the fixing members to fix each of the components in place. However, when adhesive members and the like are used, it is difficult to remove each of the components, and sometimes operation efficiency is reduced, operations are more difficult and workability also deteriorates. A fixing member is therefore preferable that allows not only the backlight assembly but also the overall structure of the image display device as a whole to be made thinner, without adversely affecting working efficiency. Clips have been developed, such as the fixing members disclosed in the above-mentioned JP-A-2003-278723, JP-A-2006-183772 and JP-A-2008-71586, but they do not sufficiently fulfill the above-described requirements.

To address this, the present invention provides a new and improved clip and backlight assembly that both improve workability and allow the overall structure to be made thinner.

According to an embodiment of the present invention, there is provided a clip including: an insert portion that is inserted into an insertion hole formed in a flat-shaped chassis and that engages with the chassis; and a collar portion that is formed as a flat plate around the circumference of the insert portion. When the insert portion is inserted into the insertion hole, the collar portion and the chassis clamp at least one light emitting board that is positioned to be in contact with the chassis. The thickness of the collar portion is set to be equal to or less than an amount of protrusion of a light emitting portion formed protrudingly from the light emitting board.

With this structure, when the insert portion of the clip is inserted into the insertion hole of the chassis, the insert portion engages with the chassis. Then, the at least one light emitting board is sandwiched between the collar portion of the clip and the chassis, and the light emitting board is clamped in place by the collar portion and the chassis. As a result, the light emitting board can be held in place with an appropriate pressure by the clip. In this case, the clip can fix the light emitting board in place simply by inserting the insert portion into the insertion hole. Further, the thickness of the collar portion is set to be equal to or less than the amount of protrusion of the light emitting portion formed protrudingly from the light emitting board, and therefore, at the time of assembly, the light emitting portion is either the same height as the collar portion of the clip, or protrudes further than the collar portion. As a consequence, the light emitted from the light emitting portion is not obstructed by the collar portion.

In addition, the insert portion may have an extension portion formed projectingly around the circumference of a leading end of the insert portion in a direction of insertion into the insertion hole.

Further, the extension portion may be formed to be larger than the diameter of the insertion hole, and when the insert portion is inserted into the insertion hole, the extension portion may pass through a groove that is formed in the outer edge of the insertion hole corresponding to the extension portion.

In addition, at least one rotation prevention protrusion, which clamps the light emitting board, may be further formed protrudingly on a surface of the collar portion such that rotation of the clip around an axis in the direction of insertion is inhibited. The rotation prevention protrusion is in contact with one of the light emitting board and the chassis.

Further, at least one locking hole may be drilled in the collar portion and may engage with a locking protrusion formed protrudingly from the chassis such that rotation of the clip around the axis in the direction of insertion is inhibited.

Also, the area of the flat plate of the collar portion may be larger than the cross-sectional area of the insert portion in a plane that is parallel to the collar portion.

Furthermore, when a reflective panel is positioned that has a light emitting hole into which the light emitting portion is inserted and that reflects light, the thickness of the collar portion may be a thickness that causes the light emitting portion inserted into the light emitting hole to protrude from the reflective panel.

In addition, a protruding portion may be formed protrudingly from the collar portion in the opposite direction to the insert portion, and the protruding portion may have a shape that does not obstruct the light emitted by the light emitting portion when the insert portion is inserted into the insertion hole and the collar portion and the chassis clamp the light emitting board.

According to an embodiment of the present invention, there is provided a backlight assembly including: a chassis that is formed in a flat shape; at least one light emitting board that has a light emitting portion formed protrudingly on one surface, and that is positioned to be in contact with the chassis on the other surface; and a clip including an insert portion that is inserted into an insertion hole formed in the chassis and that engages with the chassis, and a collar portion that is formed as a flat plate around the circumference of the insert portion. When the insert portion is inserted into the insertion hole, the collar portion of the clip and the chassis clamp the at least one light emitting board, and the thickness of the collar portion is set to be less than an amount of protrusion of the light emitting portion from the light emitting board.

According to the embodiments of the present invention described above, working efficiency can be improved and the overall structure can be made thinner.

BRIEF DESCRIPTION OF THE DRAWINGS

FIG. 1B is an explanatory diagram illustrating the structure of the backlight assembly according to the present embodiment;

DETAILED DESCRIPTION OF THE PREFERRED EMBODIMENTS

Figure 1A:
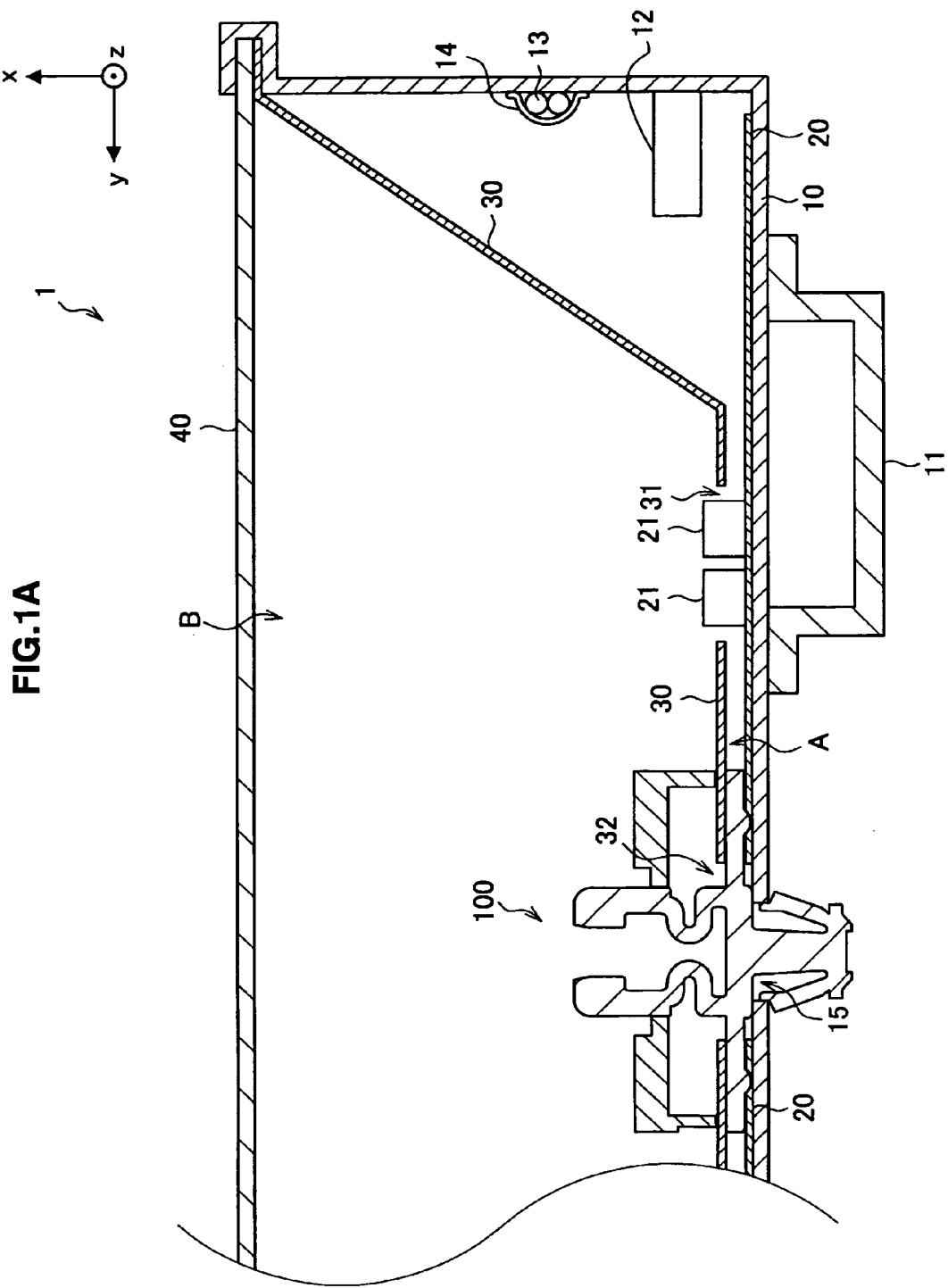
FIG. 1A is an explanatory diagram illustrating the structure of a backlight assembly according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Each embodiment of the present invention explained below relates to a clip and a backlight assembly that uses the clip. The clip has a special structure that allows not only improved working efficiency but also, when used in the backlight assembly, contributes significantly to making the backlight assembly thinner. The clip can achieve various other effects than the type of effects described here above, and these effects will be explained in detail below. To make each of the embodiments of the present invention easy to understand, before an explanation of the clip, the backlight assembly according to each embodiment of the present invention will first be explained, and then the clip will be explained mainly in relation to the backlight assembly. In other words, the explanation will be made in the order shown below. Note that in order to make examples of the effects of each of the embodiments easy to understand, in the following explanation, backlight assemblies according to related art and modified examples of the clip according to each embodiment of the present invention will be explained where applicable.

1. BACKLIGHT ASSEMBLY
2. CLIP (2.1 COLLAR PORTION; 2.2 PROTRUDING PORTION)
3. EXAMPLES OF EFFECTS

1. Backlight Assembly

FIG. 1A and FIG. 1B are explanatory diagrams illustrating the structure of a backlight assembly 1 according to a first embodiment of the present invention. Note that FIG. 1A and FIG. 1B show cross section views of a part of the backlight assembly 1. FIG. 1A is an illustrative example of an end of the backlight assembly 1, and FIG. 1B is an illustrative example of another part of the backlight assembly 1.

In FIG. 1A and FIG. 1B, the positive direction of the x axis is to the front surface (in the forward direction, the front) and a liquid crystal panel, for example, is positioned on the front surface. By emitting light in the forward direction, the backlight assembly 1 supplies light to the liquid crystal panel. The backlight assembly 1 shown in FIG. 1A and FIG. 1B is formed in a flat shape in a plane that is perpendicular to the x axis, and the thickness in the direction of the x axis corresponds to the thickness of the backlight assembly 1. In FIG. 1A and FIG. 1B, only the main structural members of the backlight assembly 1 are shown, and detailed members, such as wiring and so on, are omitted. Further, in FIG. 1A and FIG. 1B, the main structural members (a clip 100, a clip 200 and light emitting portions 21, for example) are shown as being positioned in the same cross-sectional plane, but this is simply for the ease of explanation and the arrangement position of each of the structural members is not limited to the same cross-sectional plane.

As shown in FIG. 1A and FIG. 1B, the backlight assembly 1 according to the present embodiment mainly includes a chassis 10, a light emitting board 20, a reflective panel 30, a diffusion panel 40, the clip 100 and the clip 200.

The chassis 10 is an example of a supporting member that supports each structural member. The chassis 10 is formed in a box shape in which the front surface is an opening, and is preferably formed of a metal material that has high rigidity and through which heat can easily be transferred, such as aluminum, for example. In order to increase the rigidity of the chassis 10, the back surface of the chassis 10 (the surface in the negative direction of the x axis) may have a support beam 11 (a backbone, for example) attached, that is an example of a reinforcement member. The support beam 11 is, for example, formed as an extension in a single direction on the rear surface of the chassis 10 (in the direction of the z axis, for example), and is fastened to the rear surface of the chassis 10 with, for example, a screw, a rivet or the like.

In addition, the chassis 10 is connected to the light emitting board 20 by wires 13 or the like, and also supports an electrical circuit board 12 that controls the light emitting board 20. Further, a connector (not shown in the figures) allowing connection to an external control device (not shown in the figures) is positioned on the rear surface of the chassis 10, and power source and driving signals are fed to the electrical circuit board 12 via the connector. Note that the wires 13 are fixed to the chassis 10 by being bound together by a wire damper 14. By using the wire damper 14 in this way, the wires 13 can be positioned in an orderly manner, and thus interference by the wires 13 can be prevented when arranging other structural members, and working efficiency can be improved.

When the chassis 10 is formed of a metallic material, the chassis 10 can be formed, for example, by cutting out a plate of the metallic material and bending the plate. In this case, it is preferable for light shielding tape or corner covers (cover members, not shown in the figures) to be positioned on the corner portions of the four corners of the chassis 10 such that gaps do not occur. By using the light shielding tape or corner covers, it is possible to reduce concerns of light leaking from or entering into the corner portions, and image quality can therefore be improved. Note that, in FIG. 1A and FIG. 1B, the example of the chassis 10 shown has a cross section with a generally inverted C shape, formed such that the junction between the rear surface (the surface in the negative direction of the x axis) and the side surface (for example, the face in the negative direction of the y axis) is a generally 90 degree angle. However, the shape of the chassis 10 may, for example, have rounded corners or be inclined to make the backlight assembly 1 appear thinner.

The light emitting board 20 is an electrical circuit board that has one or more light emitting portions 21 formed to protrude from the front surface of the light emitting board 20. The light emitting board 20 causes the light emitting portions 21 to emit light in accordance with driving signals supplied from the electrical circuit board 12, as described above. The rear surface of the light emitting board 20 is positioned to be in contact with the chassis 10. The surface of the chassis 10 against which the light emitting board 20 is positioned is formed with position fixing holes that fit position fixing protrusions formed in the rear surface of the light emitting board 20, and with position fixing protrusions (also referred to as tabs) that fit position fixing holes formed in the light emitting board 20 (not shown in the figures). The light emitting board 20 is therefore appropriately positioned. Note that the light emitting board 20 does not need to be a single board, but, depending on design requirements, a plurality of the light emitting boards 20 may be positioned such that they are lined up in contact with the chassis 10.

At this time, the light emitting board 20 is fixed to the chassis 10 by the clip 100 and/or the clip 200 to be described later. The light emitting board 20 is much slimmer than light emitting boards of backlight assemblies according to related art. In general, in backlight assemblies according to related art, members are, for example, screwed into place, and the structure of the fixing member makes it difficult to make the light emitting board 20 thinner. However, with the backlight assembly 1 according to the present embodiment, by using the clip 100 and/or the clip 200 to be described later, the light emitting board 20 can be made extremely slim, and it can be formed to a thickness of approximately 0.3 mm, for example.

Further, with the backlight assembly 1 according to the present embodiment, a heat transfer sheet that is generally positioned between the light emitting board 20 and the chassis 10 can be removed, thus allowing an even lower profile. The electronic components of the light emitting board 20, such as the light emitting portions 21, emit heat. As a consequence, it is important in the backlight assembly 1 to discharge this heat to the outside as much as possible. For that reason, generally in backlight assemblies according to related art, a heat transfer sheet is positioned between the light emitting board 20 and the chassis 10 such that the heat emitted by the light emitting board 20 is transferred to the chassis 10 and discharged to the outside. However, in the backlight assembly 1 according to the present embodiment, by using the clip 100 and/or the clip 200 to be described later, it is possible to increase heat transfer to the chassis 10 without using this type of heat transfer sheet.

Meanwhile, the light emitting portions 21 have, for example, light emitting diode (LED) or fluorescent lamp (FL) tubes and the like, and use the LED or FL tubes to emit light in the forward direction (in the positive direction of the x axis). Light diffusing lenses may be positioned on the end of the light emitting portions 21 in the forward direction, and the amount of light diffusion may be adjusted such that light reaches a preferable position in terms of design requirements.

The reflective panel 30 reflects the light emitted by the light emitting board 20 in the forward direction. It is preferable for the reflective panel 30 to be of a color that is highly light reflective, such as white, for example. Further, the reflective panel 30 may be formed of a material that has high reflectivity, such as, for example, a metallic material. It is preferable for the reflective panel 30 to have a shape that allows the light emitted from the light emitting board 20 to easily be reflected in the forward direction. The reflective panel 30 is positioned in the forward direction of the light emitting board 20. At that time, a light emitting hole 31 is formed in the reflective panel 30, into which the light emitting portions 21 that protrude from the light emitting board 20 are inserted. Light is emitted in the forward direction from the light emitting portions 21 that are inserted into the light emitting hole 31.

The reflective panel 30 is also fixed to the chassis 10 by the clip 100 and/or the clip 200 according to the present embodiment. At that time, the clip 100 and/or the clip 200 according to the present embodiment allow a gap A to be formed between the light emitting board 20 and the reflective panel 30. This type of the gap A prevents heat emitted from the light emitting board 20 from being transferred in the forward direction. Supposing that heat is transferred in the forward direction, this would adversely affect the liquid crystal panel (not shown in the figures) that is positioned in the forward direction, thus raising concerns of deterioration in image quality. However, as the gap A prevents heat being transferred in the forward direction, this type of defect can be reduced. The structure and so on of the clip 100 and the clip 200 that form the gap A will be described later. Note that the reflective panel 30 may be directly fixed to the chassis 10 at the end, as shown in FIG. 1A.

The diffusion panel 40 diffuses the light emitted from the light emitting board 20. In other words, light emitted from the light emitting portions 21 of the light emitting board 20 is diffused by a lens or the like, and is passed through a gap B between the reflective panel 30 and the diffusion panel 40 while being diffused. Then, the light is further diffused by the diffusion panel 40. In this way, irregularities are reduced in the light reflecting an image from the light emitting portions 21. The diffusion panel 40 is fixed to the chassis 10 at an end.

Meanwhile, the clip according to the present embodiment need not necessarily only be the clip 100 shown in FIG. 1A, but there may be a plurality of types. Another example of the clip is shown in FIG. 1B (the clip 200). The clip 200, in contrast to the clip 100, has a protruding support portion 210 that extends to reach the diffusion panel 40 in the forward direction (this is one example of a protruding portion, corresponding to a protruding portion 130 of the clip 100). The support portion 210 of the clip 200 prevents flexure or distortion of the diffusion panel 40 in the rearward direction (in the negative direction of the x axis). The clip 200 is also referred to as a stud. Note that, as the backlight assembly 1 according to the present embodiment has this type of the clip 100 and/or the clip 200, it has a structure that makes it possible to avoid attachment in an incorrect position, and this structure will be described later in more detail. Note that the following explanation will center on an explanation of the clip 100, and the clip 200 will be explained as necessary in terms of its differences with the clip 100.

2. Clip

As shown in FIG. 1A, the clip 100 is engaged with the chassis 10 by being inserted into an insertion hole 15 in the chassis 10, and at the same time clamps the light emitting board 20 and the reflective panel 30. As a result, the clip 100 transfers the load of the light emitting board 20 and the reflective panel 30 to the chassis 10. Therefore, the light emitting board 20 and the reflective panel 30 are supported without warping, distortion or separation from the chassis 10. Note that the examples in FIG. 1A and FIG. 1B show a single position of the clip 100 and the clip 200, but it is preferable for a plurality of the clip 100 and the clip 200 to be positioned in predetermined locations as required. The positions of the clip 100 and the clip 200 may be determined in accordance with the design, the strength of each of the structural members, the specifications of the backlight assembly 1 and so on.

Figure 2:
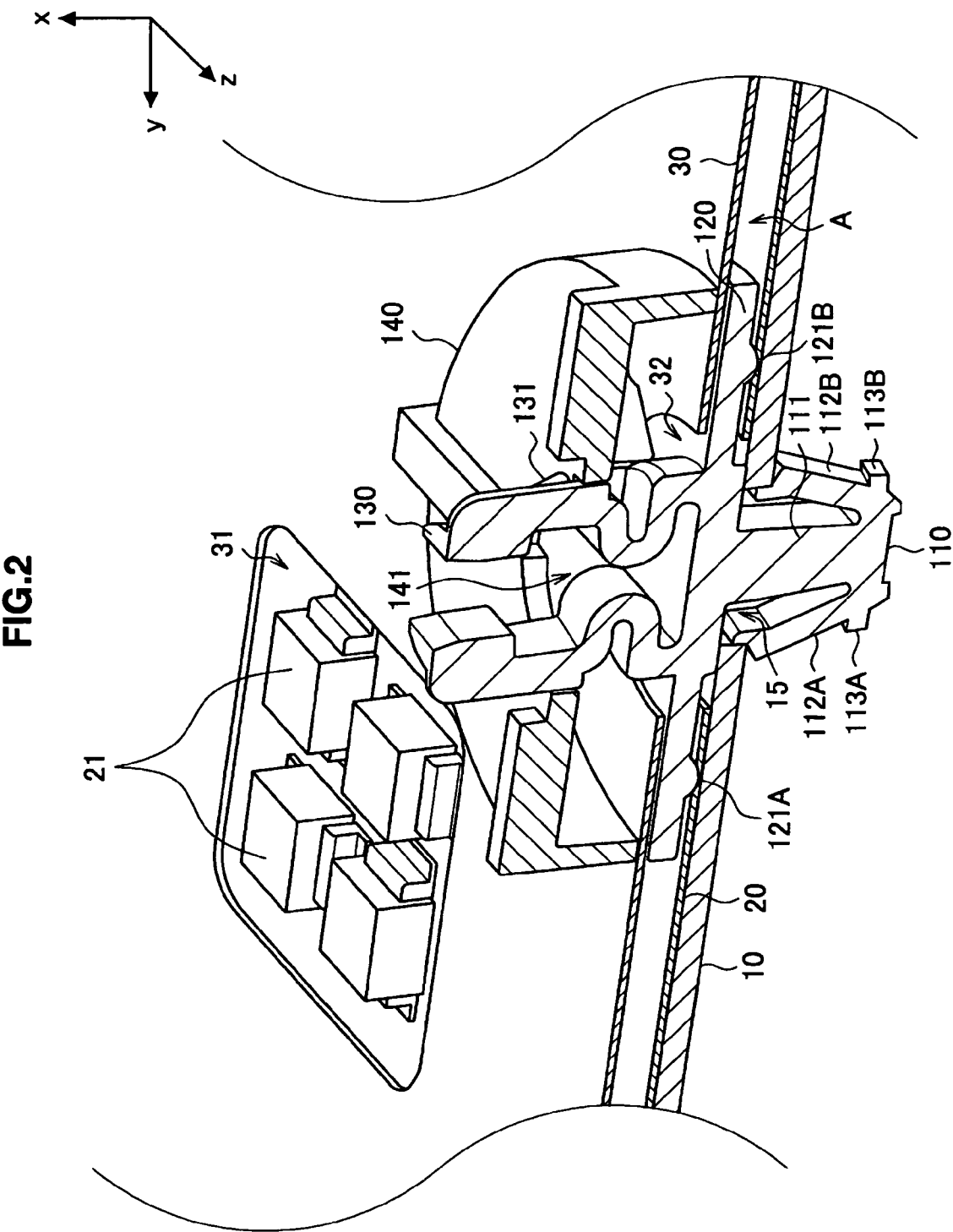
FIG. 2 is an explanatory diagram illustrating a clip according to the present embodiment.
Figure 3:
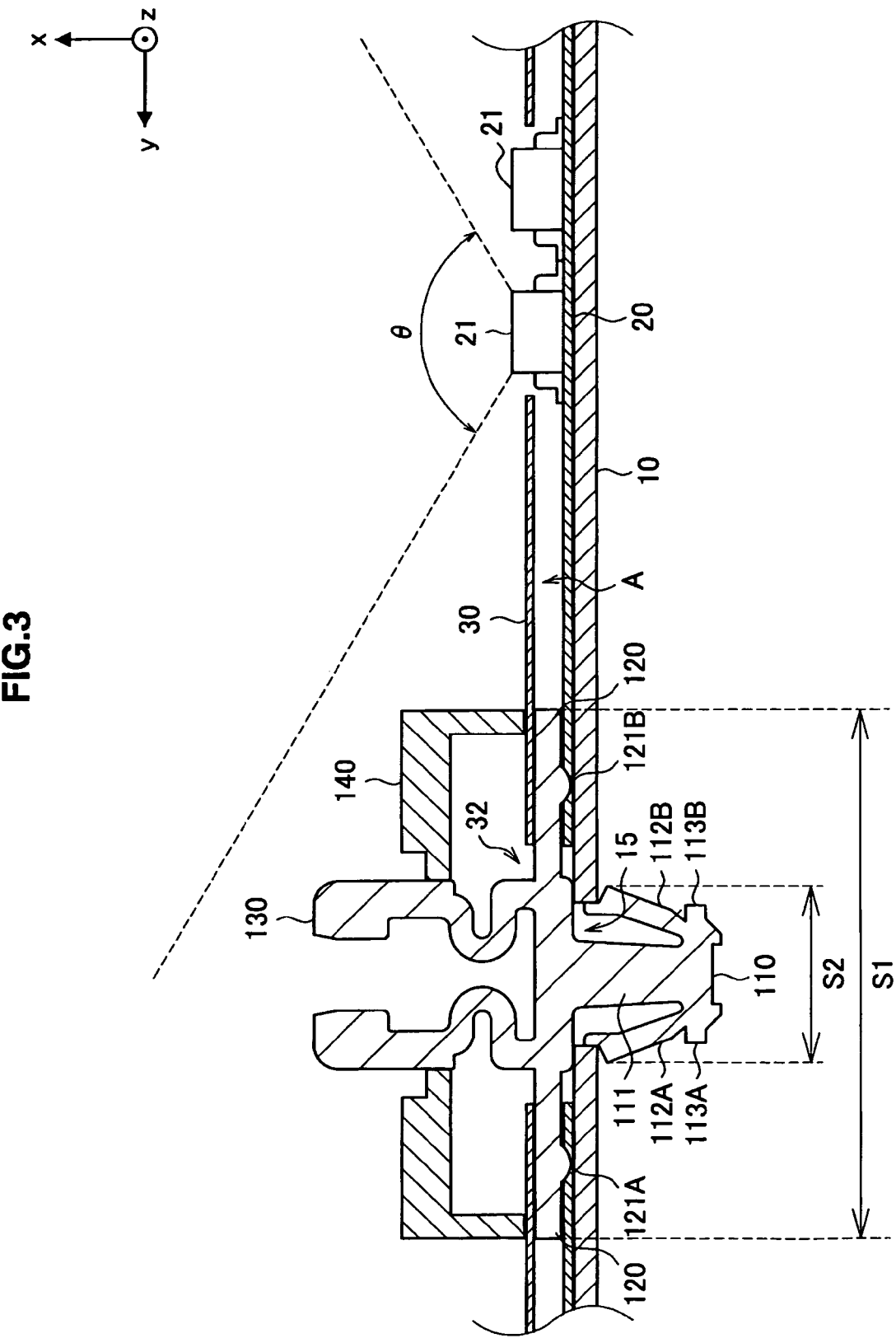
FIG. 3 is an explanatory diagram illustrating the structure of the clip according to the present embodiment.

The structure of the clip 100 will be explained below in more detail. FIG. 2 and FIG. 3 are explanatory diagrams illustrating the structure of the clip 100 according to the present embodiment. In FIG. 2, the clip 100 is shown as a cross section in the x-y plane in the center of the direction of the z axis, as seen diagonally from the forward direction (the direction of the x axis).

As shown in FIG. 2 and FIG. 3, the clip 100 mainly includes a main body portion and a cap 140. The main body portion and the cap 140 are formed such that they can engage with each other. The main body portion additionally has an insert portion 110, a collar portion 120, and the protruding portion 130. The insert portion 110, the collar portion 120 and the protruding portion 130 may be coupled together or may be integrated together as a single entity. When they are integrated together, the main body portion can be easily manufactured.

The insert portion 110 has a shape like a snap fastener, and has a support column 111, and locking claws 112A and 112B.

As shown in FIG. 2 and FIG. 3, the support column 111 is formed as a pole shape that is elongated in the negative direction of the x axis, namely in the direction of insertion of the clip 100 into the chassis 10. It is preferable for the support column 111 to be formed as a cylindrical shape such that the direction of the cylinder axis is the direction of insertion.

The locking claws 112A and 112B are coupled to the leading end of the support column 111 in the direction of insertion, and have a shape such that they separate increasingly further from the support column 111 in the opposite direction of the direction of insertion. In other words, the locking claws 112A and 112B cause the insert portion 110 to have an arrowhead shape. It is preferable for the locking claws 112A and 112B to have an elastic force and be formed as a pair, as shown, for example, in FIG. 2 and FIG. 3. Note that the number of the locking claws 112A and 112B is not limited to two, but may be, for example, a single entity or three or more. By having this type of locking claws 112A and 112B, the insert portion 110 has a shape such that its width (the width in the direction of the y axis) is increasingly reduced in the direction of insertion. Also, in the rearward direction from the direction of insertion of the locking claws 112A and 112B, the insert portion 110 has a width larger than the diameter of the insertion hole 15 that is formed in the chassis 10.

As described above, the chassis 10 is provided with the insertion hole 15 through which the insert portion 110 is inserted. By inserting the insert portion 110 of the clip 100 into the insertion hole 15 of the chassis 10, the locking claws 112A and 112B of the insert portion 110 engage with the rear surface of the chassis 10 forming the outer edge of the insertion hole 15. The clip 100 is fixed to the chassis 10 by the insert portion 110. The way in which the elements are engaged with each other will be explained in more detail. First, the clip 100 is inserted into the insertion hole 15 from the leading end of the insert portion 110 in the direction of insertion, the leading end having a width smaller than the diameter of the insertion hole 15. In this way, the locking claws 112A and 112B are compressed towards the support column 111 and pass through the insertion hole 15. Once the locking claws 112A and 112B have fully passed through the insertion hole 15, the locking claws 112A and 112B return to their original shape due to the elastic force of the locking claws 112A and 112B and, as shown in FIG. 3, the rearward portions of the locking claws 112A and 112B engage with the rear surface of the chassis 10. At that time, due to the elastic force that returns the locking claws 112A and 112B to their original shape, the locking claws 112A and 112B expand in an outward direction, and the clip 100 is securely fixed to the chassis 10 by this force of expansion.

Meanwhile, extension portions 113A and 113B are formed on the leading end of the insert portion 110 in the direction of insertion. By having the extension portions 113A and 113B, the clip 100 can be positioned accurately. The extension portions 113A and 113B will be explained in more detail later.

The collar portion 120 is formed as a flat plate around the circumference of the insert portion 110. More specifically, the collar portion 120 is formed as a flat plate to the rear of the direction of insertion of the insert portion 110, in the direction of a plane that is perpendicular to the direction of insertion. When the above-described insert portion 110 is inserted into the insertion hole 15 and thus engaged with the chassis 10, the collar portion 120 clamps the light emitting board 20 between the collar portion 120 and the chassis 10. At that time, the distance of the gap between the collar portion 120 and the locking claws 112A and 112B is set such that the collar portion 120 applies a force to the light emitting board 20 in the direction of the chassis 10. Accordingly, the light emitting board 20 is clamped between the collar portion 120 and the chassis 10. The collar portion 120 will also be explained in more detail later.

The protruding portion 130 is formed such that it protrudes in the opposite direction of the direction of insertion of the insert portion 110 from the other side of the collar portion 120. It is preferable for the protruding portion 130 to be formed above and along a center line of the insertion portion. In other words, the protruding portion 130 and the support column 111 are formed as a single cylindrical shape, and the collar portion 120 is formed around the circumference between the protruding portion 130 and the support column 111. The protruding portion 130 has a claw (not shown in the figures) that engages with the cap 140 and performs the role of fixing the cap 140 to the main body portion, while also acting as a grip that is grasped when the clip 100 is attached or removed. As a consequence, this type of protruding portion 130 allows the clip 100 to be handled easily. Further, in the case of the clip 200 (the stud) shown in FIG. 1B, in place of the protruding portion 130, the support portion 210 is formed such that the protruding portion 130 extends as far as the rear face of the diffusion panel 40. Accordingly, in the case of the clip 200, the support portion 210 that replaces the protruding portion 130 performs the roles of the protruding portion 130 described above, and also performs the role of supporting the diffusion panel 40.

As shown in FIG. 2, the cap 140 has a hole 141 that engages with the protruding portion 130 when the protruding portion 130 is inserted. To achieve this, a cap retaining portion 131 is formed on the protruding portion 130 that extends in a circumferential direction, as shown in FIG. 2 and in FIG. 4 and FIG. 5 to be explained later. The edge of the hole 141 of the cap 140 engages with the cap retaining portion 131, and the cap 140 is thus fixed to the protruding portion 130. The cap 140 also has a protrusion 142 that protrudes in the direction of the collar portion 120. Meanwhile, the reflective panel 30 has a through-hole 32 through which the protruding portion 130 passes, and is positioned above the collar portion 120. In this way, when the cap 140 is engaged with the protruding portion 130, the reflective panel 30 is sandwiched between the protrusion 142 of the cap 140 and the collar portion 120. As a consequence, the clip 100 can clamp the reflective panel 30 between the cap 140 and the main body portion and thus support it. Note that the engagement between the cap 140 and the protruding portion 130 is released by grasping and squeezing together the edges of the protruding portion 130 in the rearward direction (the edges in the positive direction of the x axis), and the cap 140 can thus be removed from the main body portion.

As explained above, the clip 100 is fixed to the chassis 10 while supporting the light emitting board 20 with the collar portion 120 and also supporting the reflective panel 30 between the collar portion 120 and the cap 140. Accordingly, the clip 100 can transfer the load of the light emitting board 20 and the reflective panel 30 to the chassis 10. At that time, the collar portion 120 of the clip 100 securely and easily presses the light emitting board 20 against the chassis 10, and the clip 100 thus maintains the appropriate gap A between the light emitting board 20 and the reflective panel 30. The clip 100 can therefore improve working efficiency and also contribute significantly to slimming down the backlight assembly 1 as a whole. Moreover, the extension portions 113A and 113B on the leading end of the insert portion 110 of the clip 100 prevent incorrect operation, and working efficiency can thus be further improved. Hereinafter, the collar portion 120 and the extension portions 113A and 113B will be explained in more detail.

2.1 Collar Portion 120

Figure 4:
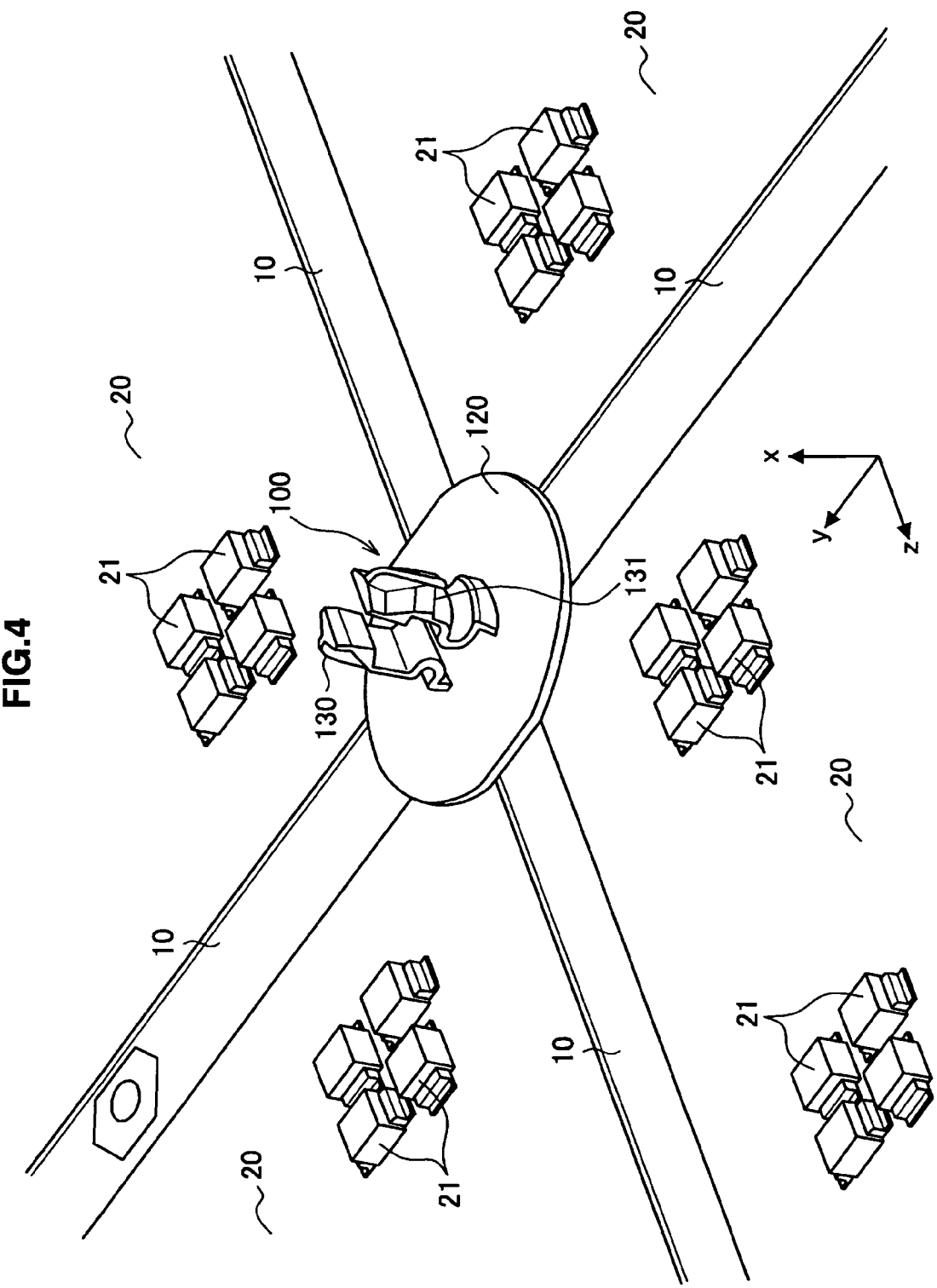
FIG. 4 is an explanatory diagram illustrating a collar portion of the clip according to the present embodiment.

As described above, the collar portion 120 is formed as a flat plate around the circumference of the insert portion 110, and clamps the light emitting board 20 between the collar portion 120 and the chassis 10. As shown in FIG. 4, it is preferable for the collar portion 120 to be formed in a generally circular shape. The collar portion 120 with a generally circular shape can hold a plurality of the light emitting boards 20 against the chassis 10 with uniform pressure.

As shown in FIG. 3 and FIG. 4, an area S1 of the flat plate shape of the collar portion 120 (the area parallel with the chassis 10) is larger than a cross-sectional area S2 of the insert portion 110 in the plane that is parallel with the collar portion 120. Further, it is preferable for the diameter of the flat plate of the collar portion 120 that includes the insert portion 110 (the diameter of the area S1) to be set three or more times larger than the diameter of the above-described cross-sectional area S2 of the insert portion 110. By making the area S1 of the collar portion 120 larger in this way, the light emitting board 20 can be pressed against the chassis 10 with a greater degree of uniform pressure, and a plurality of the light emitting boards 20 can be stably supported. Note that the cross-sectional area S2 of the insert portion 110 mentioned here is, as described above, the cross-sectional area S2 of the insert portion 110 in the plane that is parallel to the collar portion 120, and the cross-sectional area S2 may be, for example, the area of the cross section obtained when the insert portion 110 is cut in the plane parallel to the collar portion 120 at a position that results in the largest cross-sectional area. In other words, the cross-sectional area S2 is the area of the insert portion 110 when the insert portion 110 is projected onto the collar portion 120 in the direction of insertion of the insert portion 110 (in the direction of the x axis). Namely, the area S1 of the collar portion 120 is set such that it is larger than the maximum cross-sectional area S2 (or the projected area) of the insert portion 110.

Meanwhile, as shown in FIG. 3, the thickness of the collar portion 120 is the same height as the light emitting surface (the end surface in the positive direction of the x axis) of the light emitting portions 21 that are formed protrudingly from the light emitting board 20. In other words, the thickness of the collar portion 120 is set to be the same as or less than the amount of protrusion of the light emitting portions 21, or, more preferably, the thickness of the collar portion 120 is set to have a lower profile than the amount of protrusion of the light emitting portions 21. Stated in yet another way, the reflective panel 30 is mounted on the front surface of the collar portion 120 (the surface in the positive direction of the x axis) and the light emitting portions 21 are inserted into the light emitting hole 31 of the reflective panel 30. As a consequence, the thickness of the collar portion 120 is set such that the light emitting portions 21 have the same height as the front surface of the reflective panel 30 or the light emitting portions 21 extend further in the forward direction from the reflective panel 30. By forming the collar portion 120 with this type of thickness, the light emitting point of the light emitting portions 21 can be the same height as the front surface of the reflective panel 30 or can protrude further in the forward direction (in the positive direction of the x axis) from the collar portion 120 and the reflective panel 30. As a result, it is possible to prevent the occurrence of, for example, so-called "eclipsing," in which the light emitted by the light emitting portions 21 does not reach the required direction by being reflected by the collar portion 120 or the reflective panel 30, can be prevented. Such "eclipsing" causes irregularities in the amount of light emitted by the backlight assembly 1, but the backlight assembly 1 according to the present embodiment can prevent this type of irregularity, and it is thus possible to improve the image quality of the display device.

Further, with regard to the protruding portion 130, with the clip 100 shown in FIG. 1A, when the insert portion 110 is inserted into the insertion hole 15 and the collar portion 120 and the chassis 10 sandwich the light emitting board 20, the protruding portion 130 has a shape that does not block the light emitted by the light emitting portions 21. In other words, as shown in FIG. 3, the protruding portion 130 is formed in a shape such that it does not enter into the range of the angle θ over which the light is diffused by the light emitting portions 21. In the same way as the above-described thickness of the collar portion 120, this type of protruding portion 130 can also prevent so-called "eclipsing."

Further, as described above, the collar portion 120 also supports, with the cap 140, the reflective panel 30, and at that time, the gap A can be formed between the light emitting board 20 and the reflective panel 30, the gap A having a clearance that corresponds to the thickness of the collar portion 120. In general, as the light emitting board 20 energizes the light emitting portions 21 and other components, Joule's heat and so on is generated. If this heat is transferred in the forward direction, this has an impact on the liquid crystal panel (not shown in the figures) positioned on the front surface, with resulting concerns about a deterioration in image quality. However, by forming the gap A as with the clip 100 according to the present embodiment, the heat emitted from the light emitting board 20 can be allowed to escape to the chassis 10 and so on from the type of end sections shown in FIG. 1A. Further, as the collar portion 120 can press the light emitting board 20 against the chassis 10 and establish close contact, the heat can be effectively transferred from the rear surface of the light emitting board 20 to the chassis 10. On the other hand, with fixing members such as screws or other types of clip, for example, that do not have this type of collar portion 120, it is difficult for heat to efficiently escape in the way that the clip 100 according to the present embodiment allows. Here, in general, to reduce the amount of heat transferred in the forward direction, it is necessary to position a heat transfer sheet, which forcibly transfers heat to the chassis 10, between the light emitting board 20 and the chassis 10. However, in the case of the clip 100 according to the present embodiment, as described above, the heat transferred in the forward direction can be reduced, and at the same time, the heat can be efficiently transferred to the chassis 10 and so on and dissipated externally. Further, the above-described heat transfer sheet not only causes an increase in manufacturing costs, but is further a factor in increasing the thickness of the backlight assembly 1. In contrast, with the backlight assembly 1 according to the present embodiment, this type of heat transfer sheet can be eliminated, thus contributing significantly to slimming down the backlight assembly 1.

In addition, rotation prevention protrusions 121A and 121B are formed on the surface of the collar portion 120 that clamps the light emitting board 20, as shown in FIG. 2 and FIG. 3. When the clip 100 is locked with the chassis 10, the rotation prevention protrusions 121A and 121B are in contact with the light emitting board 20 or the chassis 10. Then, the rotation prevention protrusions 121A and 121B are wedged into the light emitting board 20 or the chassis 10, or alternatively are pressed firmly so that they can prevent the clip 100 from rotating around an axis in the direction of insertion of the insert portion 110. In the examples shown in FIG. 2 and FIG. 3, the number of the rotation prevention protrusions 121A and 121B is two, but the number is not limited to these examples, and may be one or three or more. Further, indentations may be formed in the light emitting board 20 or the chassis 10, into which the rotation prevention protrusions 121A and 121B can be inserted, thus increasing the rotation prevention capability.

Figure 5:
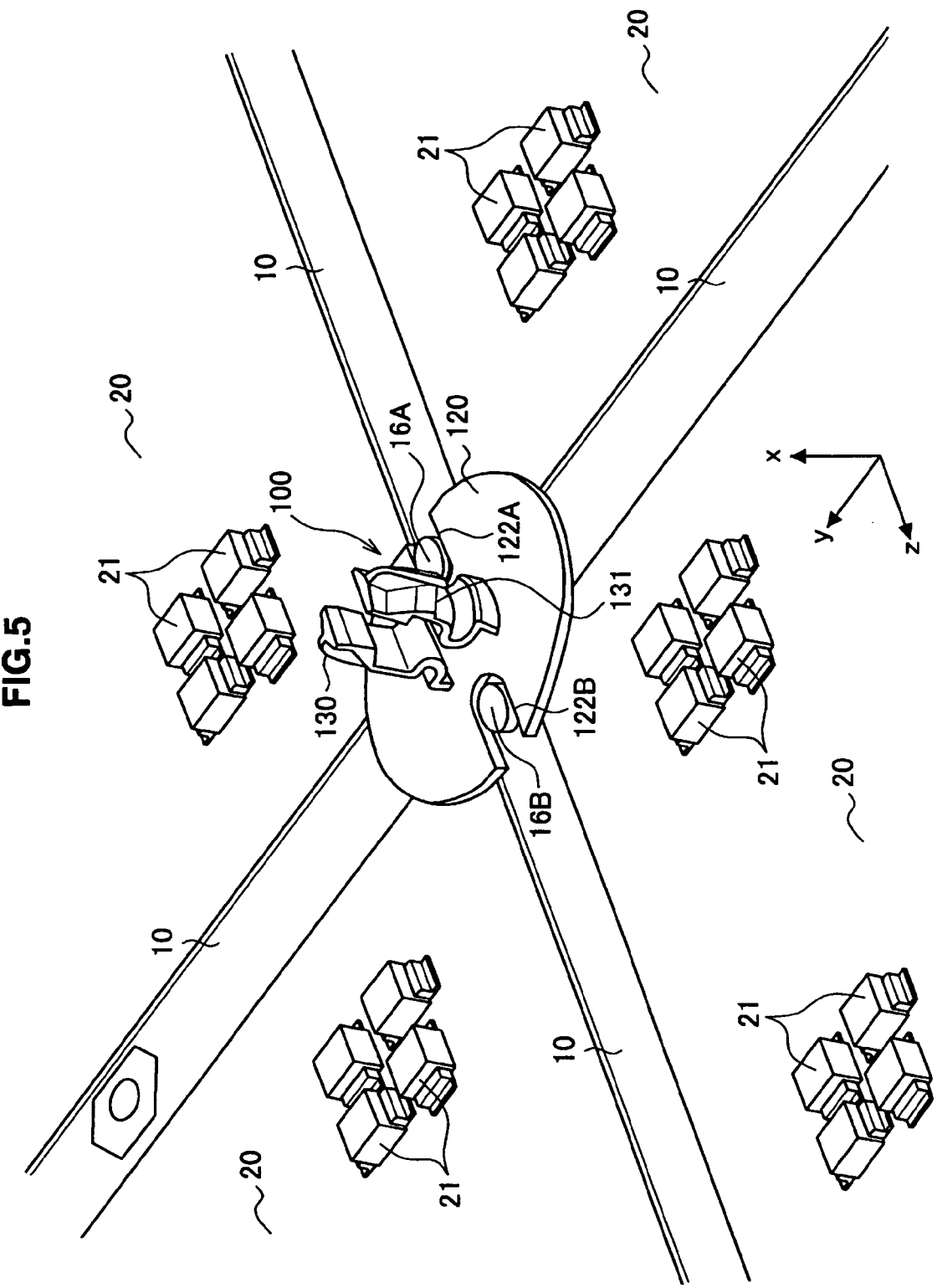
FIG. 5 is an explanatory diagram illustrating a modified example of the collar portion of the clip according to the present embodiment.

In this way, with the present embodiment, the examples shown in FIG. 2 and FIG. 3 illustrate that the clip 100 is prevented from rotating by using the rotation prevention protrusions 121A and 121B, but, a modified example is possible, as shown in FIG. 5, for example. In the modified example shown in FIG. 5, locking protrusions 16A and 16B may be formed in the front surface of the chassis 10 (the surface that opposes the collar portion 120) and locking holes 122A and 122B may be drilled in the collar portion 120 that correspond to the locking protrusions 16A and 16B. With this modified example, when the clip 100 is locked together with the chassis 10, the locking holes 122A and 122B engage with the locking protrusions 16A and 16B. Therefore, in the same way as the rotation prevention protrusions 121A and 121B, the locking holes 122A and 122B can prevent the rotation of the clip 100 around the axis in the direction of insertion of the insert portion 110.

Note that the combination of the locking protrusions 16A and 16B and the locking holes 122A and 122B, is particularly effective, as shown in FIG. 5, when they are used on the clip 100 positioned in the gap between a plurality of the light emitting boards 20. In that case, the locking protrusions 16A and 16B can prevent the light emitting board 20 from being placed in an incorrect position. Note that this combination can of course also be used on the clip 100 when it is inserted in a hole formed in one of the light emitting boards 20. It is of course also possible to use the above-described rotation prevention protrusions 121A and 121B on the clip 100 that is positioned in the gap between a plurality of the light emitting boards 20.

Further, by forming the combination of the locking protrusions 16A and 16B and the locking holes 122A and 122B, and the rotation prevention protrusions 121A and 121B on clips of different types, the correct type of clip can easily be placed in the correct position. In other words, for example, the rotation prevention protrusions 121A and 121B are used on the clip 100 shown in FIG. 1A. On the other hand, the combination of the locking protrusions 16A and 16B and the locking holes 122A and 122B is used on the clip 200 (the stud) shown in FIG. 1B. If this is done, incorrect operation can be avoided, such as inserting the clip 100 into the insertion hole 15 that is intended for the clip 200 (the stud), or inserting the clip 200 (the stud) into the insertion hole 15 that is intended for the clip 100. This can also reduce the burden on the operator and result in improved working efficiency.

2.2 Extension Portions 113A and 113B

The collar portion 120 is explained above.

Figure 6:
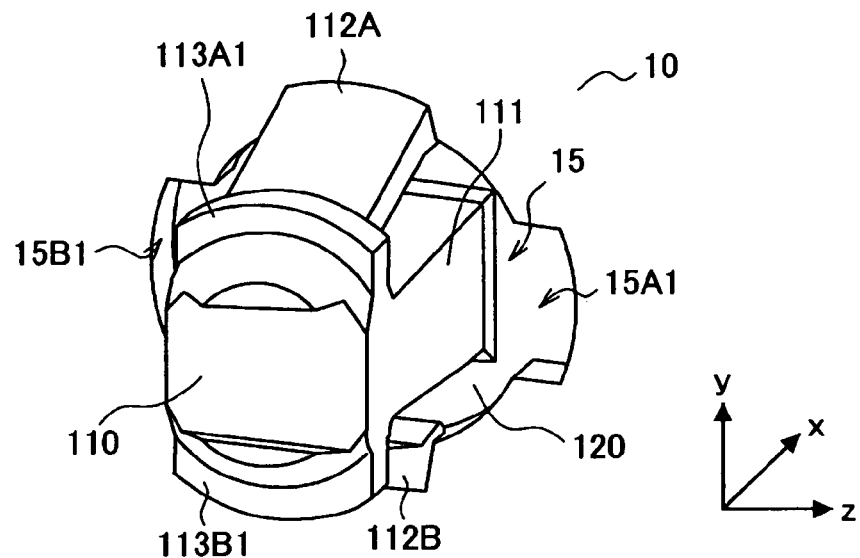
FIG. 6 is an explanatory diagram illustrating an example of a protruding portion of the clip according to the present embodiment.
Figure 7:
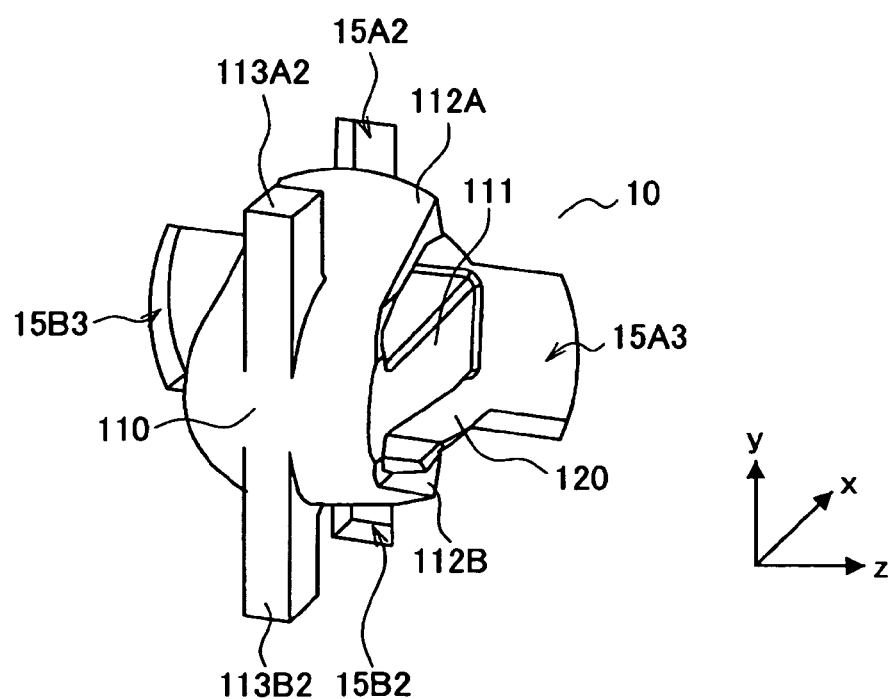
FIG. 7 is an explanatory diagram illustrating another example of a protruding portion of the clip according to the present embodiment.

Next, the extension portions 113A and 113B of the insert portion 110 will be explained with reference to FIG. 6 and FIG. 7. FIG. 6 and FIG. 7 are explanatory diagrams illustrating one example and another example of the extension portions 113A and 113B on the clip 100 according to the present embodiment. Note that FIG. 6 and FIG. 7 illustrate a situation in which the clip 100 on which the first example and the other example of the extension portions 113A and 113B are formed is inserted into the insertion hole 15 of the chassis 10, as seen from the rear surface of the chassis 10.

The extension portions 113A and 113B are as described above and as shown in FIG. 3, and are formed projectingly around the circumference of the insert portion 110 on the leading end of the insert portion 110 in the direction of insertion. Also, the extension portions 113A and 113B are formed to extend in a plane that is perpendicular to the direction of insertion of the insert portion 110.

The first example of the extension portions 113A and 113B is shown in FIG. 6 (extension portions 113A1 and 113B1), and the other example is shown in FIG. 7 (extension portions 113A2 and 113B2). The first example of the extension portions 113A1 and 113B1 and the other example of the extension portions 113A2 and 113B2 are formed in a different shape and size. In the present embodiment, as in the first example shown in FIG. 6, the extension portions 113A1 and 113B1 are formed, for example, with a width (the length in the direction of the y axis) that is the same as the diameter of the round insertion hole 15 or a smaller width. In the example shown in FIG. 7, the extension portions 113A2 and 113B2 are formed, for example, with a width that is greater than the diameter of the round insertion hole 15. Both examples will be explained.

First, the extension portions 113A1 and 113B1 shown in FIG. 6 will be explained.

As shown in FIG. 6, the extension portions 113A1 and 113B1 are formed, for example, as an opposing pair having the same width as the support column 111 (the width in the direction of the z axis). The extension portions 113A1 and 113B1 may also be formed, for example, such that the width of the leading end of the insert portion 110 that is perpendicular to the above width (the width in the direction of the y axis) is larger than the diameter of the insertion hole 15. Grooves 15A1 and 15B1 corresponding to the extension portions 113A1 and 113B1 are formed around the outer edge of the insertion hole 15 of the chassis 10. The grooves 15A1 and 15B1 have a same shape as the shape of the extension portions 113A1 and 113B1 projected in the direction of insertion (the direction of the x axis), or have a shape that internally incorporates the projected shape.

First, the extension portions 113A1 and 113B1 shown in FIG. 6 will be explained.

As shown in FIG. 6, the extension portions 113A1 and 113B1 are, for example, formed as an opposing pair having the same width as the support column 111 (the width in the direction of the z axis), and at the same time, the width of the leading end of the insert portion 110 that is perpendicular to the above width (the width in the direction of the y axis) is the same width as the diameter or the insertion hole 15 or is a smaller width. Meanwhile, the grooves 15A1 and 15B1 corresponding to the locking claws 112A and 112B of the clip 100 are formed in the outer edge of the insertion hole 15 of the chassis 10. When the clip 100 that is engaged with the chassis 10 is removed from the chassis 10, the grooves 15A1 and 15B1 allow the locking claws 112A and 112B to easily pass through the insertion hole 15. For that reason, the grooves 15A1 and 15B1 have a same shape as the shape of the locking claws 112A and 112B projected in the direction of insertion (the direction of the x axis), or have a shape that internally incorporates the projected shape.

As a consequence, the clip 100 that has the extension portions 113A1 and 113B1 shown in FIG. 6 is, for example, inserted into the chassis 10 in the following way. In other words, first, the clip 100, as shown in FIG. 6, is positioned so that the locking claws 112A and 112B are not aligned with the grooves 15A1 and 15B1 and have, for example, an approximately 90 degree displacement. Then, by pressing the clip 100 into the insertion hole 15 of the chassis 10 in the direction of insertion (the negative direction of the x axis), the extension portions 113A1 and 113B1 pass through the insertion hole 15. After that, the clip 100 is further pushed into the chassis 10, the locking claws 112A and 112B are compressed together by the insertion hole 15, and once the locking claws 112A and 112B have passed through the insertion hole 15, they expand due to elastic force. As a result, the locking claws 112A and 112B engage securely with the chassis 10 and the clip 100 is thus firmly fixed to the chassis 10 (refer to FIG. 6). Note that in the explanation given here, the clip 100 is displaced by approximately 90 degrees before insertion, such that the locking claws 112A and 112B are not aligned with the grooves 15A1 and 15B1. However, when the locking claws 112A and 112B are aligned with the grooves 15A1 and 15B1, the clip 100 can be displaced by approximately 90 degrees after insertion, such that the locking claws 112A and 112B are no longer aligned with the grooves 15A1 and 15B1 and thus the clip 100 can be firmly fixed to the chassis 10 as described above.

Note that when removing the clip 100 shown in FIG. 6 from the chassis 10, first, the clip 100 is rotated around the axis of the direction of insertion, such that the locking claws 112A and 112B are aligned with the grooves 15A1 and 15B1. When this is done, the engagement of the locking claws 112A and 112B with the chassis 10 is released by the grooves 15A1 and 15B1. Then, when the clip 100 is pulled out, the locking claws 112A and 112B and subsequently the extension portions 113A1 and 113B1 pass in that order through the grooves 15A1 and 15B1 and the clip 100 is easily removed from the chassis 10.

As the clip 100 has this type of extension portions 113A1 and 113B1, if, for example, the clip 100 is incorrectly inserted into a through-hole that is not the insertion hole 15 and that has a smaller diameter than the width of the extension portions 113A1 and 113B1, the extension portions 113A1 and 113B1 do not pass through. Therefore, the clip 100 is not fully inserted into an incorrect through-hole. As a consequence, the clip 100, by having the extension portions 113A1 and 113B1, can prevent insertion in an incorrect position.

Next, the extension portions 113A2 and 113B2 shown in FIG. 7 will be explained.

As shown in FIG. 7, the extension portions 113A2 and 113B2 are formed, for example, as an opposing pair with a narrower width than the width of the support column 111 (the width in the direction of the z axis), and at the same time, the width of the leading end of the insert portion 110 that is perpendicular to the above width (the width in the direction of the y axis) is formed to be larger than the diameter of the insertion hole 15. In this case, it is preferable for the width in the direction of the y axis to be formed to be wider than the width of the locking claws 112A and 112B in the rearward direction. In other words, the extension portions 113A2 and 113B2 are formed with a different shape to the extension portions 113A1 and 113B1 shown in FIG. 6. Meanwhile, grooves 15A2 and 15B2 corresponding to the extension portions 113A2 and 113B2 are formed in the outer edge of the insertion hole 15 of the chassis 10. The grooves 15A2 and 15B2 have a same shape as the shape of the extension portions 113A2 and 113B2 projected in the direction of insertion (the direction of the x axis) or have a shape that internally incorporates the projected shape. Further, to allow easy insertion and removal of the clip 100, grooves 15A3 and 15B3 (corresponding to the above-described grooves 15A1 and 15B1) may also be formed on the outer edge of the insertion hole 15 of the chassis 10. It is preferable for the grooves 15A3 and 15B3 to have a same shape as the shape of the locking claws 112A and 112B projected in the direction of insertion (the direction of the x axis) or have a shape that internally incorporates the projected shape.

The clip 100 that has the extension portions 113A2 and 113B2 shown in FIG. 7 is inserted, for example, into the chassis 10 in the following way. In other words, first, the clip 100 is positioned so that the extension portions 113A2 and 113B2 are aligned with the grooves 15A2 and 15B2. Then, by pressing the clip 100 into the insertion hole 15 of the chassis 10 in the direction of insertion (the negative direction of the x axis), the extension portions 113A2 and 113B2 pass through the grooves 15A2 and 15B2. After that, the clip 100 is further pushed into the chassis 10, the locking claws 112A and 112B are compressed together by the insertion hole 15, and once the locking claws 112A and 112B have passed through the insertion hole 15, they expand due to elastic force. As a result, the locking claws 112A and 112B engage securely with the chassis 10 and the clip 100 is thus firmly fixed to the chassis 10 (refer to FIG. 7).

Note that when removing the clip 100 shown in FIG. 7 from the chassis 10, the clip 100 is first rotated approximately 90 degrees around the axis in the direction of insertion. When this is done, the engagement of the locking claws 112A and 112B with the chassis 10 is released by the grooves 15A3 and 15B3. Then, when the clip 100 is pulled out, the locking claws 112A and 112B pass through the grooves 15A3 and 15B3. After that, the clip 100 is once again rotated approximately 90 degrees such that the extension portions 113A2 and 113B2 are aligned with the grooves 15A2 and 15B2. Then, by further pulling out the clip 100, the extension portions 113A2 and 113B2 pass through the grooves 15A2 and 15B2 and the clip 100 is easily removed from the chassis 10.

As the clip 100 has this type of extension portions 113A2 and 113B2, if, for example, the clip 100 is incorrectly inserted into a through-hole that is not the insertion hole 15 and that has a smaller diameter than the width of the extension portions 113A2 and 113B2, the extension portions 113A2 and 113B2 do not pass through. Therefore, the clip 100 is not fully inserted into an incorrect through-hole. As a consequence, by having the extension portions 113A2 and 113B2, the clip 100 shown in FIG. 7, in the same way as the clip 100 shown in FIG. 6, can prevent insertion in an incorrect position. Further, when attaching the clip 100, the clip 100 is prevented from rotating by the above-described rotation prevention protrusions 121A and 121B or the above-described locking holes 122A and 122B and so on. Therefore, as shown in FIG. 6 and FIG. 7, for example, if the locking claws 112A and 112B are in a different position to the grooves 15A1 and 15B1 or the grooves 15A3 and 15B3, it is possible to reduce the possibility that both are aligned. As a consequence, the rotation prevention protrusions 121A and 121B or the locking holes 122A and 122B can prevent the clip 100 from disengaging.

Note that here two examples have been given of the shape of the extension portions 113A and 113B, but a variety of other modified examples are conceivable with regard to the shape of the extension portions 113A and 113B. When seen from the direction of the x axis, the extension portions 113A1 and 113B1 in FIG. 6 are flat ribs, and the extension portions 113A2 and 113B2 shown in FIG. 7 are bar-shaped ribs. However, different shaped extension portions 113A and 113B can be formed, for example, by changing the dimensions of the flat ribs or the bar-shaped ribs. Further, when seen from the direction of the x axis, the extension portions 113A and 113B can be elongatedly formed, for example, as non-opposing ribs, such as one rib or three or more ribs. The ribs can also be a variety of shapes, such as an elliptical shape, or a polygonal shape, such as a triangular shape, a quadrangular shape or a pentagonal shape and the like. Moreover, in this case, when seen from the direction of the x axis, the extension portions 113A and 113B can be formed in a variety of shapes by forming additional protrusions on the flat ribs or the bar-shaped ribs, and by changing the shape, position and number of the additional protrusions. Grooves with a shape corresponding to the shape of the extension portions 113A and 113B are formed in the insertion hole 15. Here, with regard to the extension portions 113A and 113B, when seen from the x axis, it is preferable for the distance from the center of the support pillar 111 to the edge of the leading end of the insert portion 110, including the extension portions 113A and 113B, to be non-uniform. In other words, the extension portions 113A and 113B cause the shape of the leading end of the insert portion 110 as seen from the direction of the x axis to change to a shape different from the generally circular shape. Namely, in the examples shown in FIG. 6 and FIG. 7, the width of the leading end of the insert portion 110 in the direction of the y axis is set to be longer than the width of the leading end of the insert portion 110 in the direction of the z axis. By making the shape of the leading end different in this way, incorrect insertion of the clip 100 in a through-hole that does not have the corresponding grooves 15A1, 15B1, 15A2 and 15B2 can be prevented. Moreover, as shown in FIG. 7, it is preferable for the shape of the extension portions 113A and 113B projected in the direction of insertion to extend beyond the shape of the locking claws 112A and 112B projected in the same direction (namely, the shape of the extension portions 113A and 113B should be at least partially larger). In this case, the extension portions 113A and 113B can reliably prevent insertion in a hole other than the corresponding insertion hole 15, and can moreover reduce concerns about insertion in an incorrect position.

Two examples of the shape of the extension portions 113A and 113B are described above. Here, for example, when a plurality of types of the clip 100 and the clip 200 shown in FIG. 1A and FIG. 1B are used in the backlight assembly 1, if the above-described two examples of the extension portions 113A and 113B are used in combination, incorrect insertion can be prevented even more effectively.

In other words, for example, the extension portions 113A1 and 113B1 shown in FIG. 6 are provided on the clip 100 shown in FIG. 1A, and the extension portions 113A2 and 113B2 shown in FIG. 7 are provided on the clip 200 (the stud) shown in FIG. 1B. By doing this, the plurality of types of the clip 100 and the clip 200 that are to be positioned in the same backlight assembly 1 can be inserted accurately in the correct positions. It is therefore possible to more effectively prevent incorrect operations, such as mixing up the positions of the clips 100 and 200. In addition, this type of incorrect operation prevention effect can be further improved by further combining the above-described rotation prevention protrusions 121A and 121B, locking protrusions 16A and 16B and locking holes 122A and 122B. In this situation, by making the diameter of the insert portion 110 of the clip 200 that has the extension portions 113A2 and 113B2 shown in FIG. 7 and the diameter of the insertion hole 15 into which the clip 200 is inserted smaller than the extension portions 113A1 and 113B1 of the other clip 100, prevention of the above-described incorrect operation can be achieved even more effectively. Namely, if it is attempted to insert the clip 200 with the extension portions 113A2 and 113B2 shown in FIG. 7 into the incorrect insertion hole 15, the extension portions 113A2 and 113B2 cannot pass through the insertion hole 15 and incorrect insertion is thus prevented. On the other hand, if it is attempted to insert the clip 100 that has the extension portions 113A1 and 113B1 shown in FIG. 6 into the incorrect insertion hole 15, the extension portions 113A1 and 113B1 are larger than the incorrect insertion hole 15 and therefore cannot pass through the insertion hole 15, thus preventing incorrect insertion.

3. Examples Of Effects

The clip 100 and the clip 200 according to the first embodiment of the present invention, and the backlight assembly 1 that has the clip 100 and the clip 200 are explained above. The above explanation also includes examples of the effects of the present embodiment and so on where applicable, and in order to make the effects of the present embodiment more easily understood, examples of the effects of the present embodiment will be explained while making comparisons to known backlight assemblies and backlight assembly attachment members.

Figure 8:
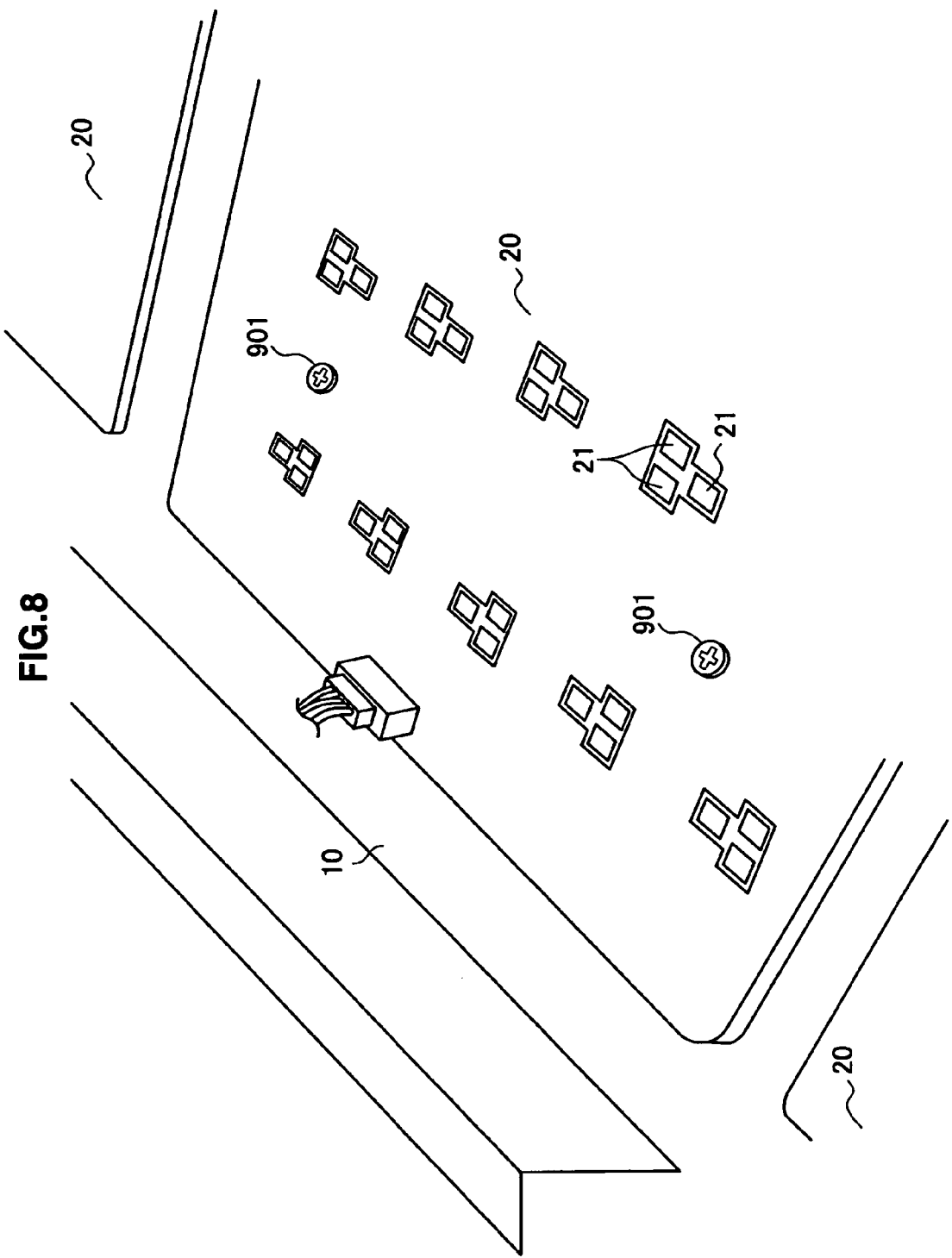
FIG. 8 is an explanatory diagram illustrating an example of attachment members of a backlight assembly according to related art.
Figure 9:
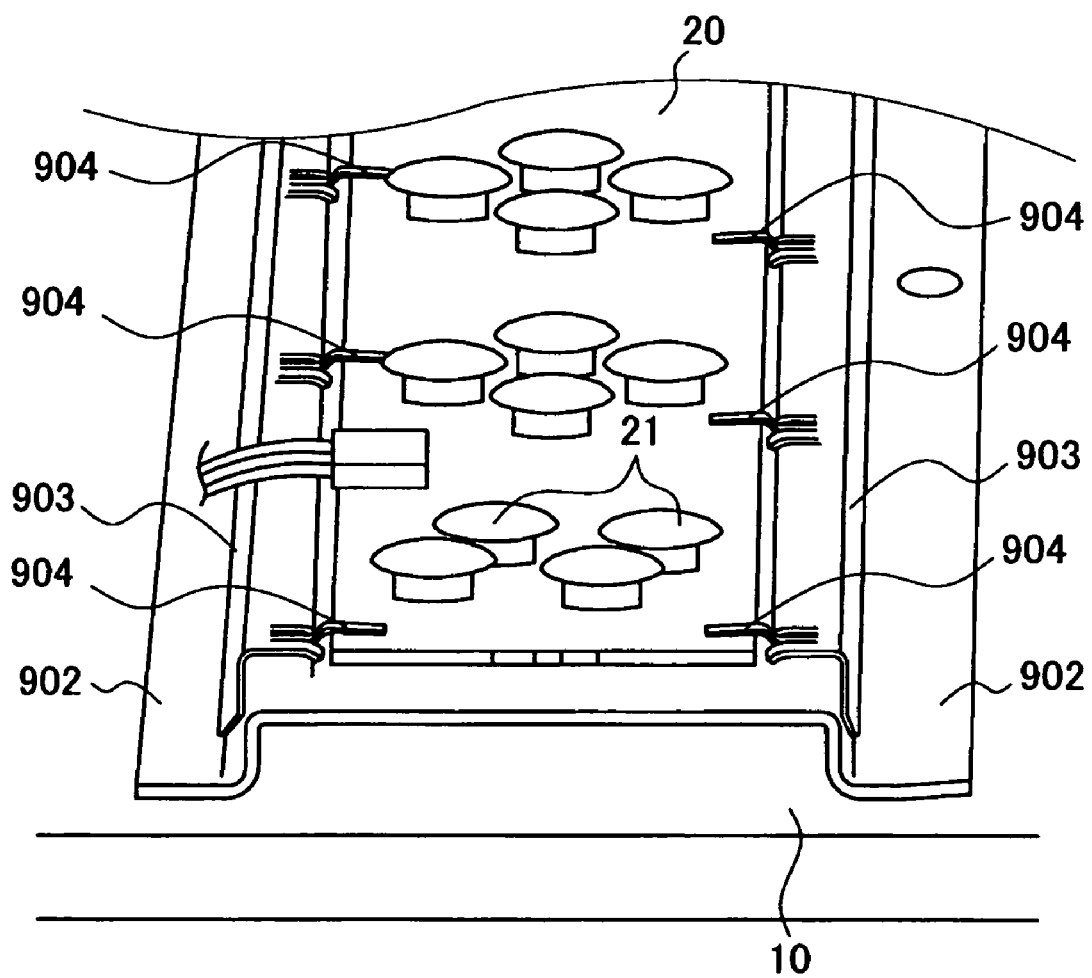
FIG. 9 is an explanatory diagram illustrating another example of attachment members of a backlight assembly according to related art.

FIG. 8 and FIG. 9 are explanatory diagrams illustrating individual examples of attachment members of backlight assemblies according to related art. Note that, in the related art shown in FIG. 8 and FIG. 9, as well as not using the clip 100 and the clip 200, the structure of each of the members is also different, but for ease of explanation, the same reference numerals are allocated to the members corresponding to the above-described present embodiment.

In FIG. 8, as an example of related art, in the backlight assembly, the light emitting board 20 is fixed to the chassis 10 using screws 901 as the fixing members. When the screws 901 are used as fixing members as in this related art, as it is necessary to rotate the screws 901 to fix the light emitting board 20 to the chassis 10, it sometimes requires a long time for the operation to fix each of the screws 901 one at a time. Furthermore, minute pressure adjustments are very important to adjust the tightening torque for the screws 901 to a predetermined torque and fix the light emitting board 20 to the chassis 10 at a predetermined pressure. As a consequence, a high degree of skill is required for the operation, and working efficiency also deteriorates. To reduce this type of operating labor and effort, it is conceivable to use a powered driver or the like, for example, to tighten the screws 901, but provision of this type of driver leads to increased costs.

In addition, with this related art, as the light emitting board 20 is held in place by the head portion of the screws 901, it is necessary for the light emitting board 20 to have a certain strength, and it is therefore necessary to make the light emitting board 20 thicker. However, if the light emitting board 20 becomes thicker, the thickness of the backlight assembly also increases, thus obstructing slimming down of the backlight assembly. Further, when the light emitting board 20 is thicker, its heat transfer efficiency deteriorates, and it is therefore necessary to position a heat transfer sheet between the light emitting board 20 and the chassis 10 that transfers heat to the chassis 10. The heat transfer sheet not only increases the cost of manufacture but also increases the thickness of the backlight assembly.

Then, with this related art, there are concerns that the head portion of the screws 901 may protrude higher than the light emitting portions 21, and that light may be reflected by the thickness of the head portion and by the reflective panel positioned above the head portion and so on, resulting in irregularities in the light emitted by the backlight assembly. In this case, for example, even if a countersunk screw with a plate-shaped head portion is used, it is next necessary to form an inclined surface on the light emitting board 20 that corresponds to the slant of the head portion of the countersunk screw, and moreover, as the pressure is applied in the direction of the chassis 10 on the inclined surface, it is necessary to further increase the thickness of the light emitting board 20.

Meanwhile, FIG. 9, as the other example of related art, illustrates an example in which, in a backlight assembly, the light emitting board 20 is fixed to the chassis 10 using jigs 903 as the fixing members. When the jigs 903 are used as fixing members as in this related art, protrusions 902 are protrudingly formed from the chassis 10 and the jigs 903 are positioned on the protrusions 902. Additionally, a plurality of claws 904 are formed on the jigs 903, and the light emitting board 20 is fixed to the jigs 903 by the claws 904. With this type of structure, if the claws 904 become bent, they are no longer able to support the light emitting board 20. As a consequence, it is difficult to remove the light emitting board 20 after once positioning it. Further, it is necessary to perform operations in a way that does not damage the claws 904. In addition, a large fitting force must be applied with great care in order to insert the light emitting board 20 into the claws 904. There is accordingly a significant load on the operator, and working efficiency is also poor. Also, in the same way as the above-described related art, heat transfer efficiency from the light emitting board 20 to the chassis 10 is poor, and a heat transfer sheet is therefore necessary. Moreover, the thickness of the backlight assembly is increased in the sections of the protrusions 902 and the claws 904 only, and this obstructs slimming down of the backlight assembly.

In addition, as further examples of related art that are not shown in the figures, there are backlight assemblies in which the light emitting board 20 is fixed to the chassis 10 using an adhesive member, such as strong double-sided adhesive tape etc. However, when using this type of adhesive member, it is possible that the adhesive member will deteriorate due to the heat of the light emitting board 20. In addition, after once bonding the chassis 10 and the light emitting board 20, it is very difficult to separate the two, resulting in poor working efficiency.

In addition, when using a clip other than the clip 100 according to the present embodiment, the clip has a certain amount of height, and its use is therefore limited to positions in which the clip will not cause optical reflection or eclipsing. Moreover, when a plurality of types of clip are used, there are concerns about operation errors, such as inserting the clip in the incorrect position. The clip that is inserted in the incorrect position cannot appropriately fix the structural members, resulting in concerns about failures, such as separation of the structural members and so on. In order to avoid such operation errors, it is necessary for the operator to be visually aware and vigilant, and the load on the operator is therefore significant. Moreover, the clip that is inserted in the incorrect position cannot be removed without breaking it, leading to reduced productivity.

In contrast to the points that require improvement in this type of related art, the clip 100 according to the first embodiment of the present invention, as described above, resolves these points requiring improvement and can also contribute significantly to slimming down the overall structure. In other words, as the clip 100 presses the light emitting board 20 against the chassis 10 using the collar portion 120, it can be attached and removed extremely easily. The collar portion 120 can support the light emitting board 20 easily using an appropriate pressure, and can also create the gap A between the light emitting board 20 and the reflective panel 30. As a consequence, the light emitting board 20 can be made thinner, and there is no need to position a heat transfer sheet. Furthermore, the extension portions 113A and 113B prevent the occurrence of operation errors. In addition, the rotation prevention protrusions 121A and 121B or the locking protrusions 16A and 16B and the locking holes 122A and 122B can reduce concerns about the clip 100 rotating and becoming detached from the chassis 10, and operation errors in which the clip 100 is inserted in the incorrect position are also more effectively prevented. Moreover, the clip 100 has an extremely simple structure, and can be manufactured both easily and at a low cost. Thus, as well as eliminating the cost of the heat transfer sheet, manufacturing costs can also be reduced.

It should be understood by those skilled in the art that various modifications, combinations, sub-combinations and alterations may occur depending on design requirements and other factors insofar as they are within the scope of the appended claims or the equivalents thereof.

What is claimed is:

1. A clip comprising:
    an insert portion that is inserted into an insertion hole formed in a flat-shaped chassis and that engages with the chassis;
    a collar portion that is formed as a flat plate around the circumference of the insert portion; and
    a cap retaining portion for engaging a cap such that the cap and the collar portion are operable to secure the light emitting board and a reflective panel to maintain a fixed gap between the light emitting board and the reflective panel,
    wherein
    when the insert portion is inserted into the insertion hole, the collar portion and the chassis clamp at least one light emitting board that is positioned to be in contact with the chassis, and
    the thickness of the collar portion is set to be equal to or less than an amount of protrusion of a light emitting portion formed protrudingly from the light emitting board.

2. The clip according to claim 1, wherein
    the insert portion has an extension portion formed projectingly around the circumference of a leading end of the insert portion in a direction of insertion into the insertion hole.

3. The clip according to claim 2, wherein
    the extension portion is formed to be larger than the diameter of the insertion hole, and when the insert portion is inserted into the insertion hole, the extension portion passes through a groove that is formed in the outer edge of the insertion hole corresponding to the extension portion.

4. The clip according to claim 2, wherein
at least one rotation prevention protrusion, which clamps the light emitting board, is further formed protrudingly on a surface of the collar portion such that rotation of the clip around an axis in the direction of insertion is inhibited, the at least one rotation prevention protrusion being in contact with one of the light emitting board and the chassis.

5. The clip according to claim 2, wherein
at least one locking hole is drilled in the collar portion and engages with a locking protrusion formed protrudingly from the chassis such that rotation of the clip around the axis in the direction of insertion is inhibited.

6. The clip according to claim 1, wherein
the area of the flat plate of the collar portion is larger than the cross-sectional area of the insert portion in a plane that is parallel to the collar portion.

7. The clip according to claim 1, wherein
when the reflective panel is positioned that has a light emitting hole into which the light emitting portion is inserted and that reflects light, the thickness of the collar portion is a thickness that causes the light emitting portion inserted into the light emitting hole to protrude from the reflective panel.

8. The clip according to claim 1, further comprising:
a protruding portion that is formed protrudingly from the collar portion in the opposite direction to the insert portion; wherein
the protruding portion has a shape that does not obstruct the light emitted by the light emitting portion when the insert portion is inserted into the insertion hole and the collar portion and the chassis clamp the light emitting board.

9. A backlight assembly comprising:
a chassis that is formed in a flat shape;
at least one light emitting board that has a light emitting portion formed protrudingly on one surface, and that is positioned to be in contact with the chassis on the other surface; and
a clip including
an insert portion that is inserted into an insertion hole formed in the chassis and engages with the chassis,
a collar portion that is formed as a flat plate around the circumference of the insert portion, and
a cap retaining portion for engaging a cap such that the cap and the collar portion are operable to secure the light emitting board and a reflective panel to maintain a fixed gap between the light emitting board and the reflective panel,
wherein
when the insert portion is inserted into the insertion hole, the collar portion of the clip and the chassis clamp the at least one light emitting board, and
the thickness of the collar portion is set to be equal to or less than an amount of protrusion of the light emitting portion from the light emitting board.

* * * * *